United States Patent [19]

Ozawa et al.

[11] Patent Number: 4,884,332
[45] Date of Patent: Dec. 5, 1989

[54] TOOL CHANGER

[75] Inventors: Akira Ozawa; Tomomi Kousaka, both of Saitama; Hideo Suzuki; Masatoshi Murakami, both of Shizuoka, all of Japan

[73] Assignee: Honda Giken Kogyo Kabushiki Kaisha, Tokyo, Japan

[21] Appl. No.: 193,072

[22] Filed: May 12, 1988

[30] Foreign Application Priority Data

May 12, 1987 [JP] Japan .................. 62-71507[U]

[51] Int. Cl.⁴ .................................. B23Q 3/157
[52] U.S. Cl. .................................. 29/568; 409/211
[58] Field of Search ............ 29/568; 409/204, 211, 409/216

[56] References Cited

U.S. PATENT DOCUMENTS

| 3,483,796 | 12/1969 | Galbarini et al. | 409/216 |
| 3,953,918 | 5/1976 | Bone et al. | 29/568 |
| 4,426,763 | 1/1984 | Hornok et al. | |
| 4,467,517 | 8/1984 | Kurata | 29/568 |
| 4,516,311 | 5/1985 | Takakuwa et al. | |

FOREIGN PATENT DOCUMENTS

| 45836 | 3/1983 | Japan | 29/568 |
| 61-44546 | 3/1986 | Japan . | |
| 255746 | 4/1970 | U.S.S.R. | 29/568 |
| 1144844 | 3/1985 | U.S.S.R. | 29/568 |
| 946987 | 3/1961 | United Kingdom . | |
| 1124312 | 11/1964 | United Kingdom . | |
| 1095233 | 1/1965 | United Kingdom . | |
| 1149931 | 8/1965 | United Kingdom . | |
| 1101014 | 2/1966 | United Kingdom . | |

Primary Examiner—Daniel Howell
Attorney, Agent, or Firm—Birch, Stewart, Kolasch & Birch

[57] ABSTRACT

A tool changer has a pair of chucking units mounted respectively on the ends of a tool arm and movable in mutually opposite directions for simultaneously gripping tools, the tool arm being angularly movable 180° for changing tools. The tool changer is used in a machine tool having a spindle device for holding and rotating a tool about its own axis and a tool magazine for storing a plurality of tools to be mounted, one at a time, on the spindle device. The tool changer comprises a tool arm disposed between the spindle device and the tool magazine, the tool arm being angularly movable about an axis parallel to an axis of the spindle device and movable along the first-mentioned axis, a pair of chucking unit mounted respectively on ends of the tool arm and movable in mutually opposite directions passing through the first-mentioned axis for simultaneously gripping tools, respectively, and a mechanism for actuating the tool arm and the chucking units.

5 Claims, 22 Drawing Sheets

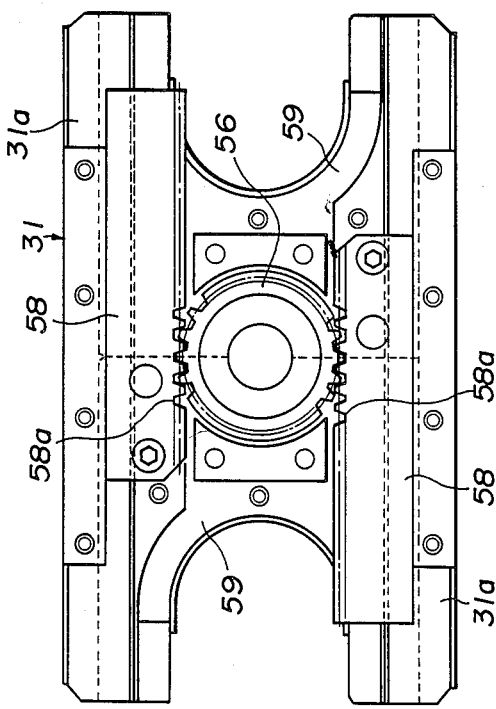
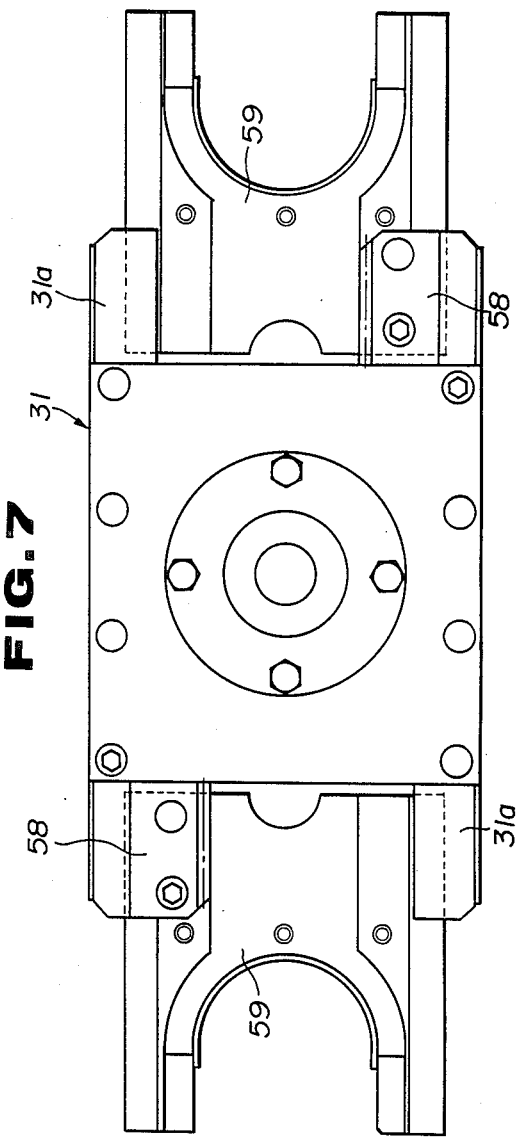
FIG. 6
FIG. 7

FIG.10
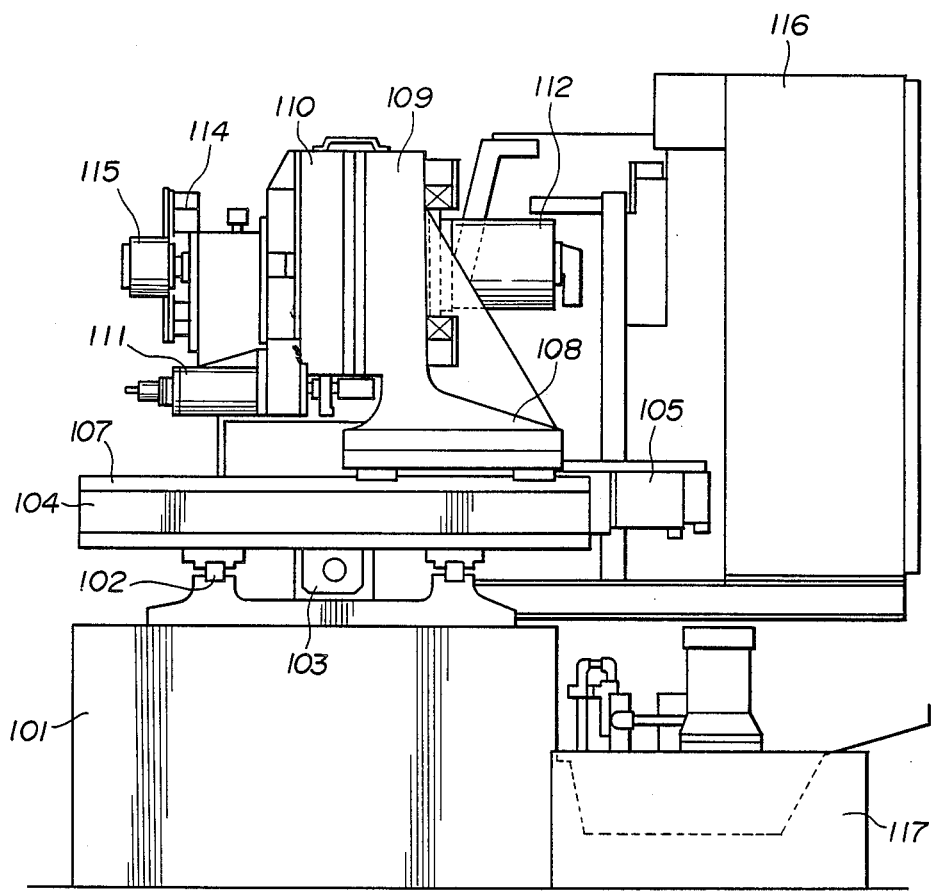
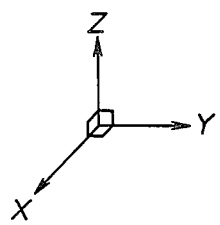

TOOL CHANGER

BACKGROUND OF THE INVENTION

1. Field of the Invention

The present invention relates to a tool changer for use with a machine tool having a spindle device, such as a tapping machine, a drilling machine, or the like.

2. Description of the Relevant Art

Tapping machines and drilling machines equipped with spindle devices are required to change tools when different workpiece types are to be machined.

Japanese Laid-Open Patent Publication No. 61-44546 discloses a tool changer for use with a machine tool having a spindle device, the tool changer having a tool changing arm disposed between a tool magazine storing a number of different tools and the spindle device, and having chucking units on its opposite ends. For changing tools, the tool changing arm and the spindle device are moved in unison along parallel paths toward the tool magazines, and tools are gripped by the respective chucking units on the tool changing arm, which is then turned 180° to change the tools.

With the conventional tool changer, however, since the entire tool changer and the spindle device have to be moved in a parallel manner toward the tool magazine, a relatively large driving mechanism is required for moving the tool changer and the spindle device. Other drive sources for rotating the tool changing arm, moving the tool changing arm back and forth, and moving the tool changer as a whole are also needed For this reason, the overall machine setup is large in size, heavy, and requires complex control modes for controlling movement of the various components.

SUMMARY OF THE INVENTION

It is an object of the present invention to provide a tool changer which is highly efficiently, is small in size, is lightweight, is reliable in movement, and is highly durable.

According to the present invention, a tool changer is provided in a machine tool having a spindle device for holding and rotating a tool about its own axis and a tool magazine for storing a plurality of tools to be mounted, one at a time, on the spindle device. The tool changer comprises a tool arm disposed between the spindle device and the tool magazine, the tool arm being angularly movable about an axis parallel to an axis of the spindle device and movable along the first-mentioned axis, a pair of chucking units mounted respectively on ends of the tool arm and movable in mutually opposite directions passing through the first-mentioned axis for simultaneously gripping tools, respectively, and a mechanism for actuating the tool arm and the chucking units.

The above and further objects, details and advantages of the present invention will become apparent from the following detailed description of preferred embodiments thereof, when read in conjunction with the accompanying drawings.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description give hereinbelow and the accompanying drawings which are given by way of illustration only, and thus, are not limitative of the present invention, and wherein:

FIG. 6 is a view taken along line VI—VI of FIG. 4;

FIGS. 7 and 8 are views similar to FIGS. 6 and 5, respectively, explaining operation;

FIG. 10 is a side elevational view of the machine tool shown in FIG. 9;

DETAILED DESCRIPTION OF THE PREFERRED EMBODIMENTS

A first embodiment of the present invention will be described below with reference to FIGS. 1 through 8.

Figure 1:
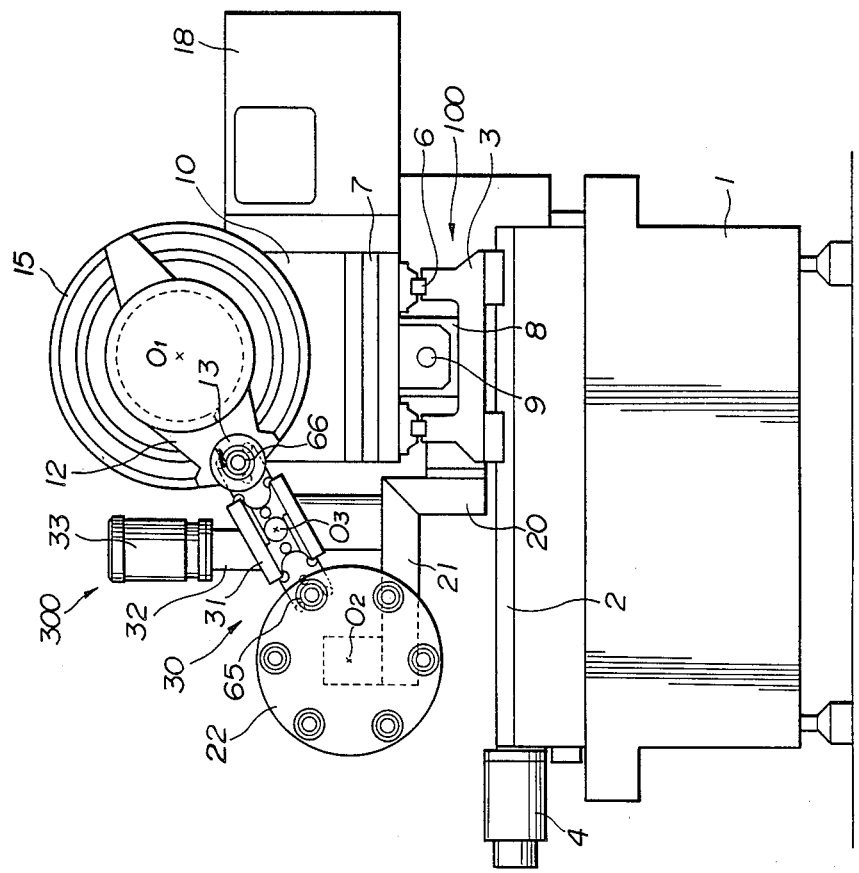
FIG. 1 is a front elevational view of a machine tool incorporating a tool changer according to a first embodiment of the present invention.
Figure 2:
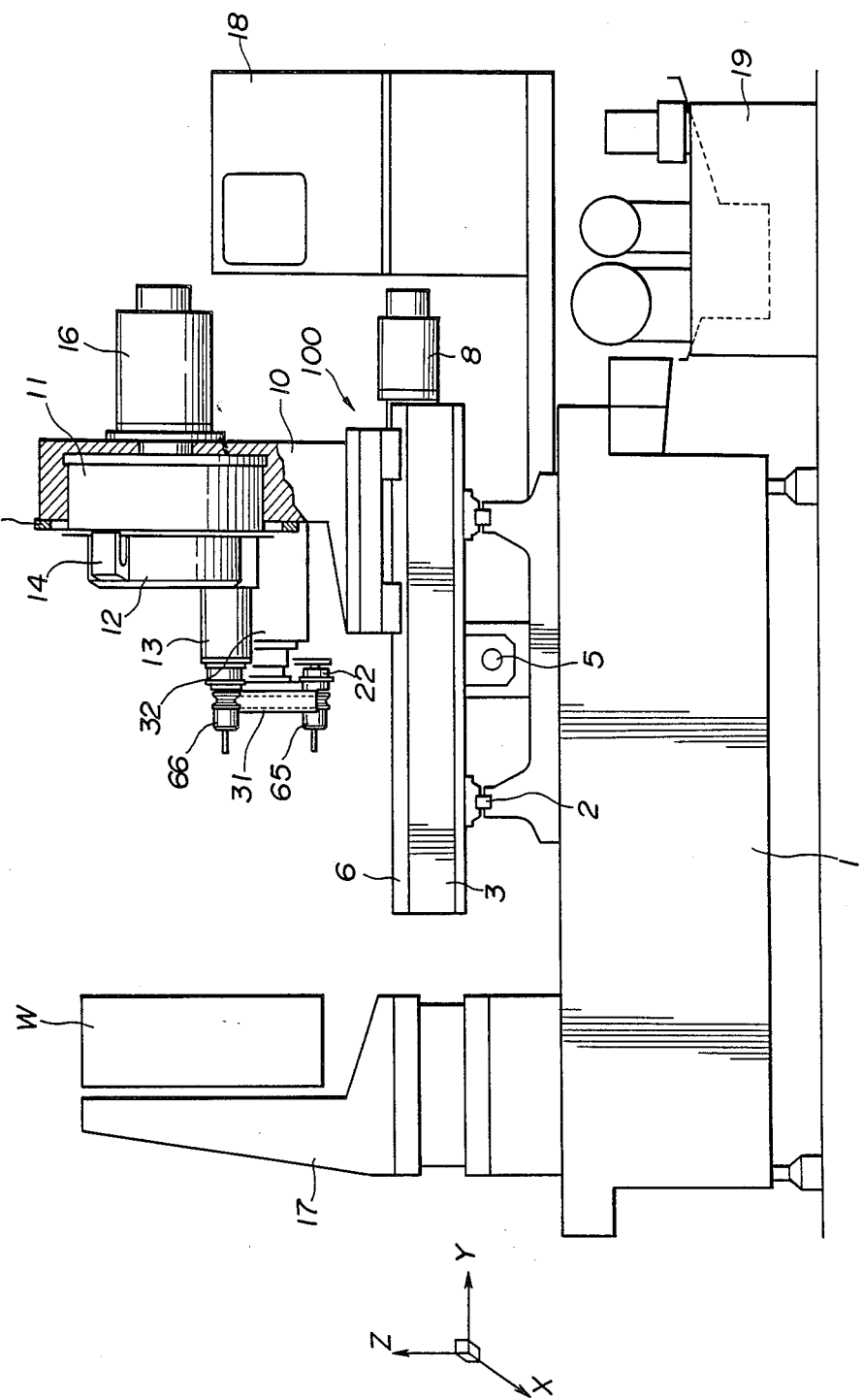
FIG. 2 is a side elevational view of the machine tool shown in FIG. 1.
Figure 3:
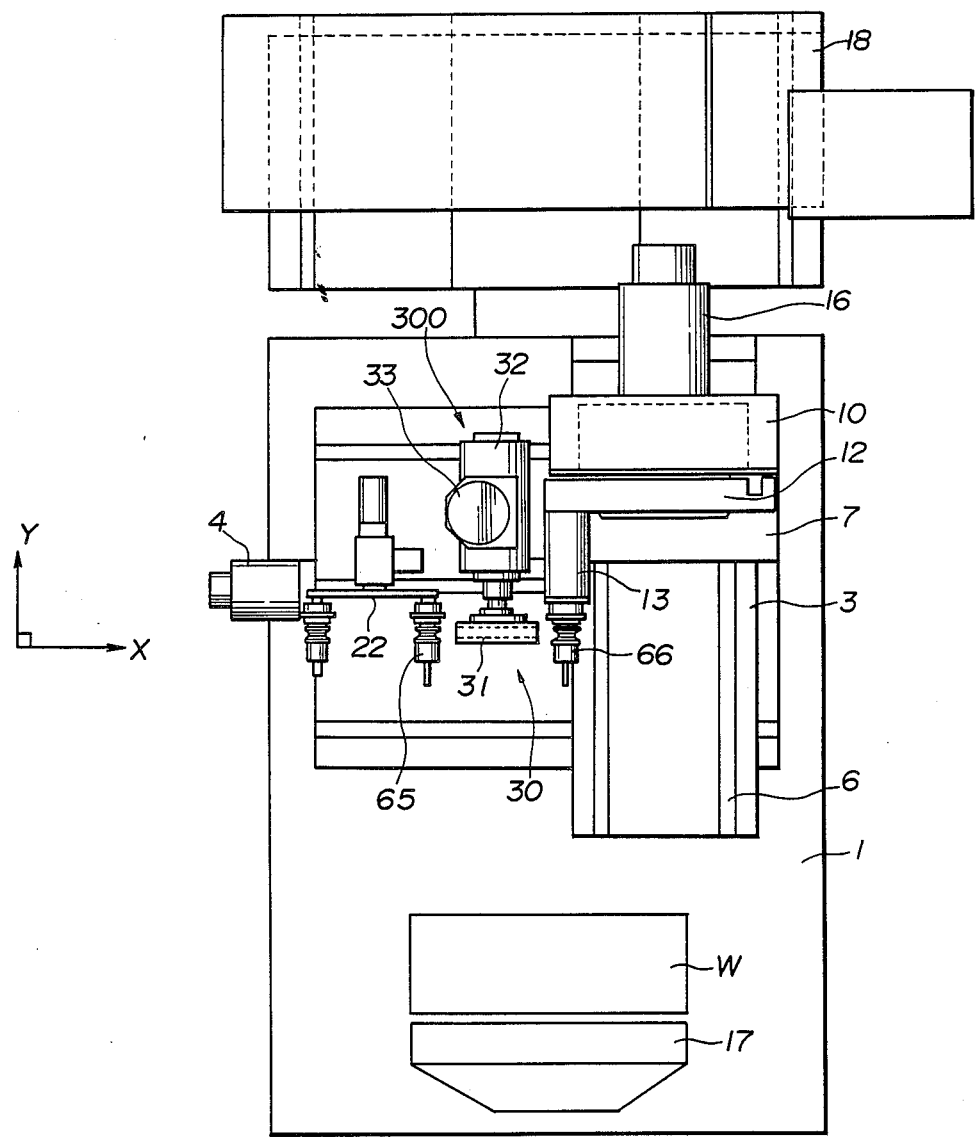
FIG. 3 is a plan view of the machine tool shown in FIG. 1.

As illustrated in FIGS. 1 through 3, guide rails 2 extending in the direction of an X-axis are mounted on a bed 1 fixedly disposed on a floor, and an X table 3 is slidably mounted on the guide rails 2. The bed 1 supports thereon a motor 4 for rotating a ball screw 5 about its own axis The ball screw 5 is threaded in a portion of the X table 3. The X table 3 can be moved back and forth in the direction of the X axis along the guide rails 2 in response to energization of the motor 4.

Guide rails 6 are mounted on an upper surface of the X table 3, and a Y table 7 is slidably mounted on the guide rails 6. The Y table 7 has a portion in which there is threaded a ball screw 9 that can be rotated about its own axis by a motor 8 fixedly mounted on the X table 3. In response to energization of the motor 8, the Y table 7 can be moved back and forth along the guide rails 6 in the direction of a Y axis normal to the X axis.

The X table 3 and the Y table 7 jointly provide a cross-slide table assembly 100 on which a support body 10 is mounted thereon. The support body 10 can thus be moved to a desired position on an X-Y plane which serves as a reference plane of the bed 1.

A turning arm 12 is angularly movably suported on the support body 10 and can be swung in an X-Z plane normal to the X-Y plane by a motor 11 fixedly mounted in the support body 10. A spindle device 13 is mounted on one end of the turning arm 12, whereas a support unit 14 is disposed on the other end of the turning arm 12. A support ring 15 is mounted on the front face of the support body 10 around the motor 11 in slidable contact with the back surfaces of the support unit 14 and the spindle device 13 for keeping the turning arm 12 in a desired posture during operation.

A spindle motor 16 is mounted on the back of the support body 10 for rotating the spindle shaft of the spindle device 13. The bed 1 supports on one end a fixing base 17 for supporting a workpiece W to be machined by a tool 66 in confronting relation to the spindle device 13. A control box 18 having a control panel is mounted on the other end of the bed 7, with a coolant unit 19 disposed on the floor below the control box 18.

As shown in FIG. 1, a support arm 20 extends upwardly from the X table 3, and a branch arm 21 extends horizontally from the support arm 20 on the distal end of the branch arm 21, a tool magazine 22 is supported which is angularly movable about an axis parallel to the axis O1 of the spindle device 13. A plurality of different tools are detachably held on the tool magazine 22 along its periphery at equally spaced intervals. A tool changer 30 disposed between the tool magazine 22 and the spindle device 13.

The tool changer 30 comprises a tool arm 31 and a driver mechanism 300 for turning the tool arm 31 about an axis O3 parallel to the axis O1 of the spindle device 13, moving the tool arm 31 along the axis O3, and moving chucking units 600 (described later on).

The structures of the driver mechanism 300 and the tool arm 31 will now be described with reference to FIGS. 4 through 8.

Figure 4:
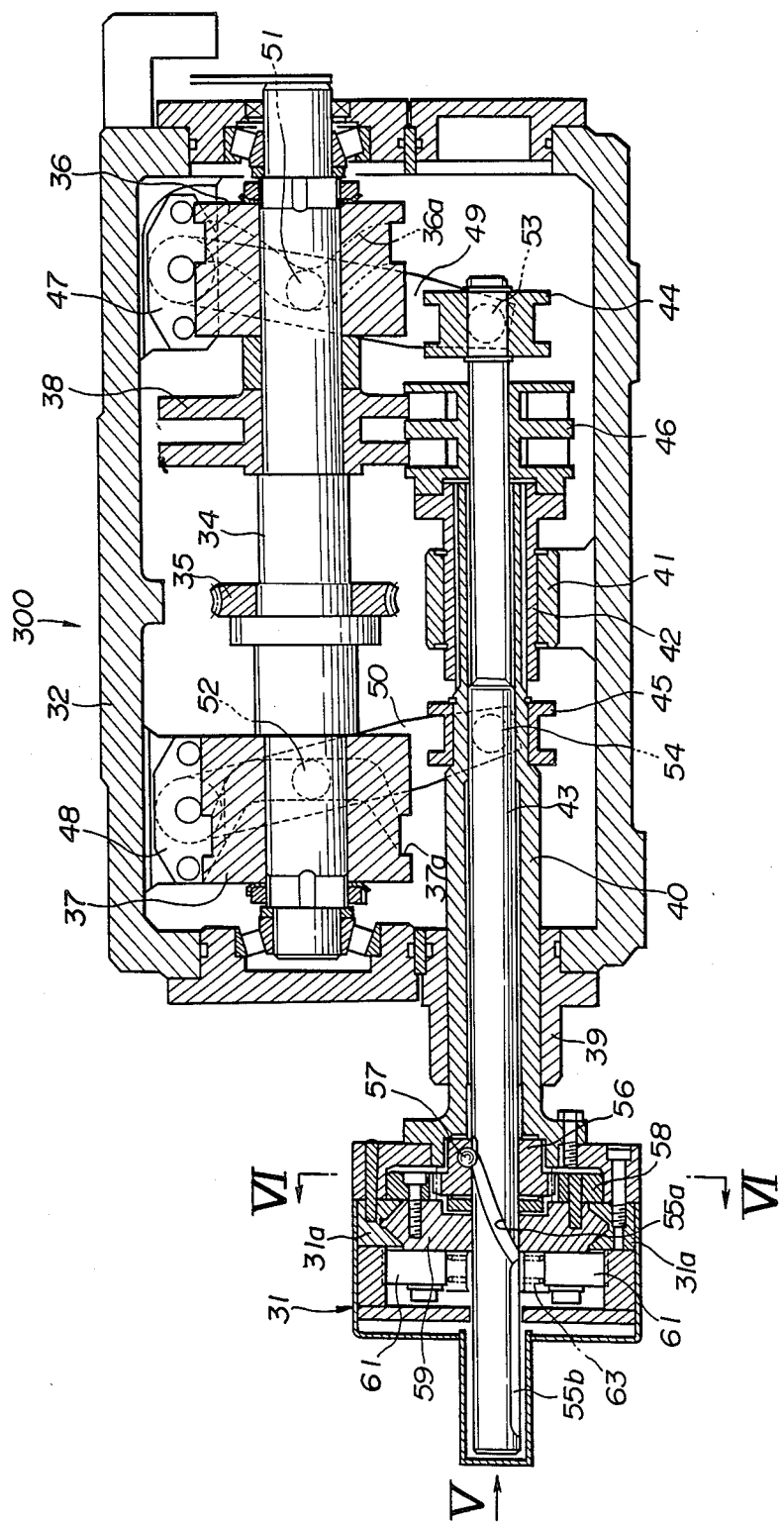
FIG. 4 is a cross-sectional view of the tool changer of the first embodiment.

FIG. 4 shows the driver mechanism 300 in cross section. The driver mechanism 300 has a casing 32 in which a countershaft 34 is rotatably disposed A worm gear 35 is fitted over the countershaft 34 for transmitting rotation of a driver motor 33 to the countershaft 34 Slot cams 36, 37 having cam slots 36a, 37a defined therein are fixed to the opposite ends, respectively, of the countershaft 34. A parallel index cam 38 is also fitted over the countershaft 34 between the worm gear 35 and one of the slot cams 36.

A guide bushing 39 is mounted on a front surface of the casing 32, and a hollow outer shaft 40 is slidably inserted through the guide bushing 39. The tool arm 31 is attached to one end of the outer shaft 40 outside of the casing 32. The other end of the outer shaft 40 in the casing 32 is splined to a bushing 42 rotatably supported by a bearing 41 disposed in the casing 32. The outer shaft 40 is supported parallel to the countershaft 34 by the bushings 39, 42. The countershaft 34 and the outer shaft 40 lie parallel to the axis of the spindle device 13.

An inner shaft 43 is axially slidably inserted through the outer shaft 40. The inner shaft 43 has one end extending through the tool arm 31 and the other end projecting from the outer shaft 40 in the casing 32. Roller guides 44, 45 are mounted on the other end of the inner shaft 43 and an intermediate portion of the outer shaft 40, respectively A spider 46 which is engaged by the parallel index cam 38 on the countershaft 34 is fixed to one end of the bushing 42. Brackets 47, 48 are mounted on an upper surface of the casing 32. Swingable links 49, 50 have upper ends pivotally suported on the brackets 47, 48, respectively, and intermediate portions and distal ends to which rollers 51, 52, 53, 54 are attached. The roller 51 installed on the intermediate portion of the swingable link 49 rollingly engages in the cam slot 36a of the slot cam 36. The roller 52 installed on the intermediate portion of the swingable link 50 rollingly engages in the cam slot 37a of the slot cam 37. The roller 53 installed on the distal end of the swingable link 49 engages the roller guide 44 on the inner end of the inner shaft 43, whereas the roller 54 installed on the distal end of the swingable link 50 engages the roller guide 45 on the intermediate portion of the outer shaft 40.

When the countershaft 34 is rotated about its own axis by the motor 33, the swingable links 49, 50 are caused to swing about their upper ends, and the outer shaft 40 and the inner shaft 43 are independently moved back and forth (horizontally in FIG. 4). The rotation of the countershaft 34 causes the parallel index cam 38 and the spider 46 to intermittently rotate the outer shaft 40 about its own axis in increments of 180°.

The inner shaft 43 has a helical groove 55a and a straight groove 55b defined in a portion thereof disposed in the tool arm 31. A pinion 56 is rotatably fitted over the inner shaft 43 and held in operative engagement with the helical groove 55a and the straight groove 55b through a ball 57. When the ball 57 engages in the helical groove 55a, the pinion 56 can be rotated in response to back-and-forth movement of the inner shaft 43.

Figure 5:
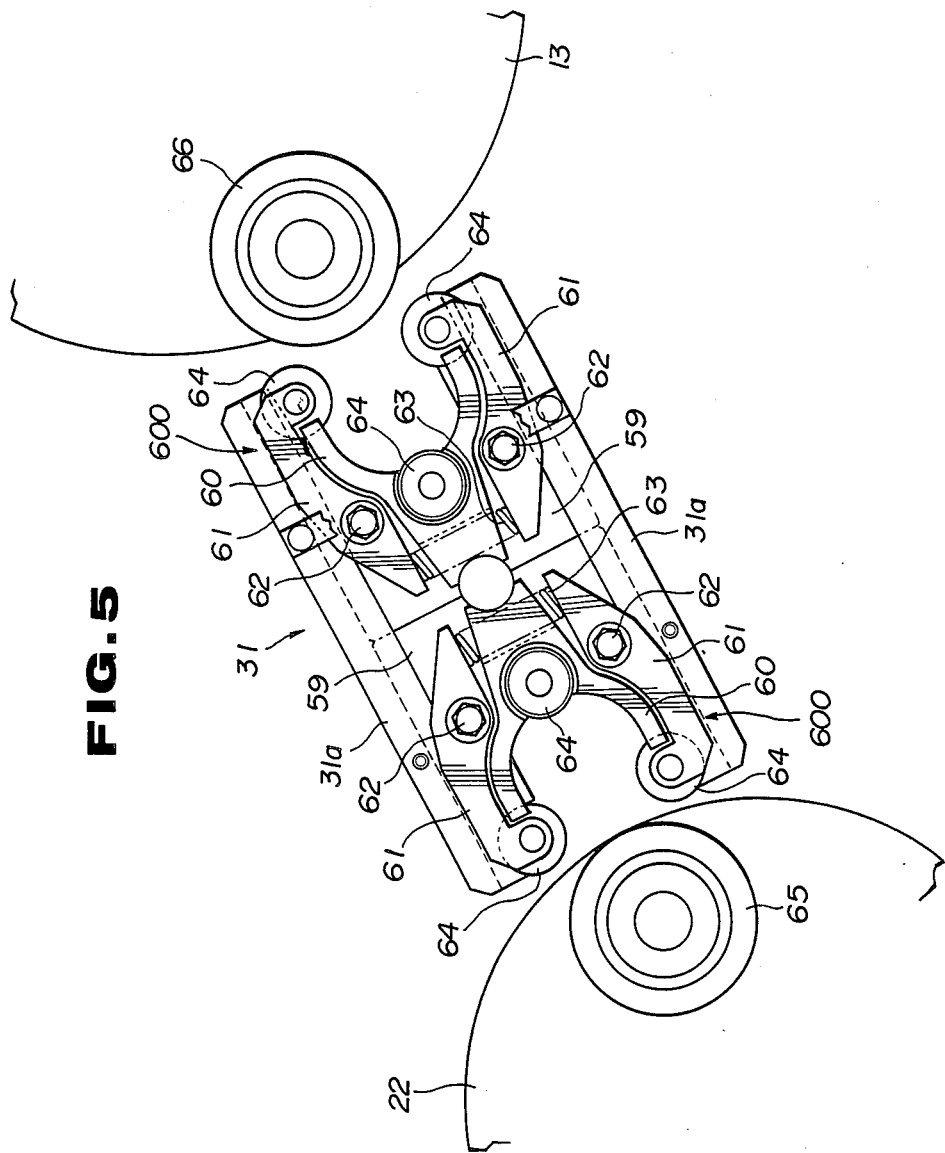
FIG. 5 is a view as seen in the direction of the arrow V in FIG. 4.

As shown in FIGS. 5 and 6, the tool arm 31 has a pair of parallel rails 31a with which slide members 58 are slidably held in engagement. Racks 58a on the slide members 58 are held in mesh with the pinion 56. Upon rotation of the pinion 56, the slide members 58 are linearly moved in mutually opposite directions To the slide members 58, there are attached respective support plates 59 with bifurcated members 60 mounted thereon. Fingers 61 are swingably supported on the outer sides of the bifurcated members 60 for swinging movement about shafts 62. Springs 63 are disposed under compression between base ends of the fingers 61 for normally urging the fingers 61 in a direction to close the distal ends thereof.

Rollers 64 for gripping tools (or tool holders) are mounted on the distal ends of the fingers 61 and the intermediate portions of the bifurcated members 60.

The fingers 61, the springs 63, and the rollers 64 jointly serve as the chucking units 600 disposed outwardly of the slide members 58, the support plates 59, and the bifurcated members 60.

Figure 8:
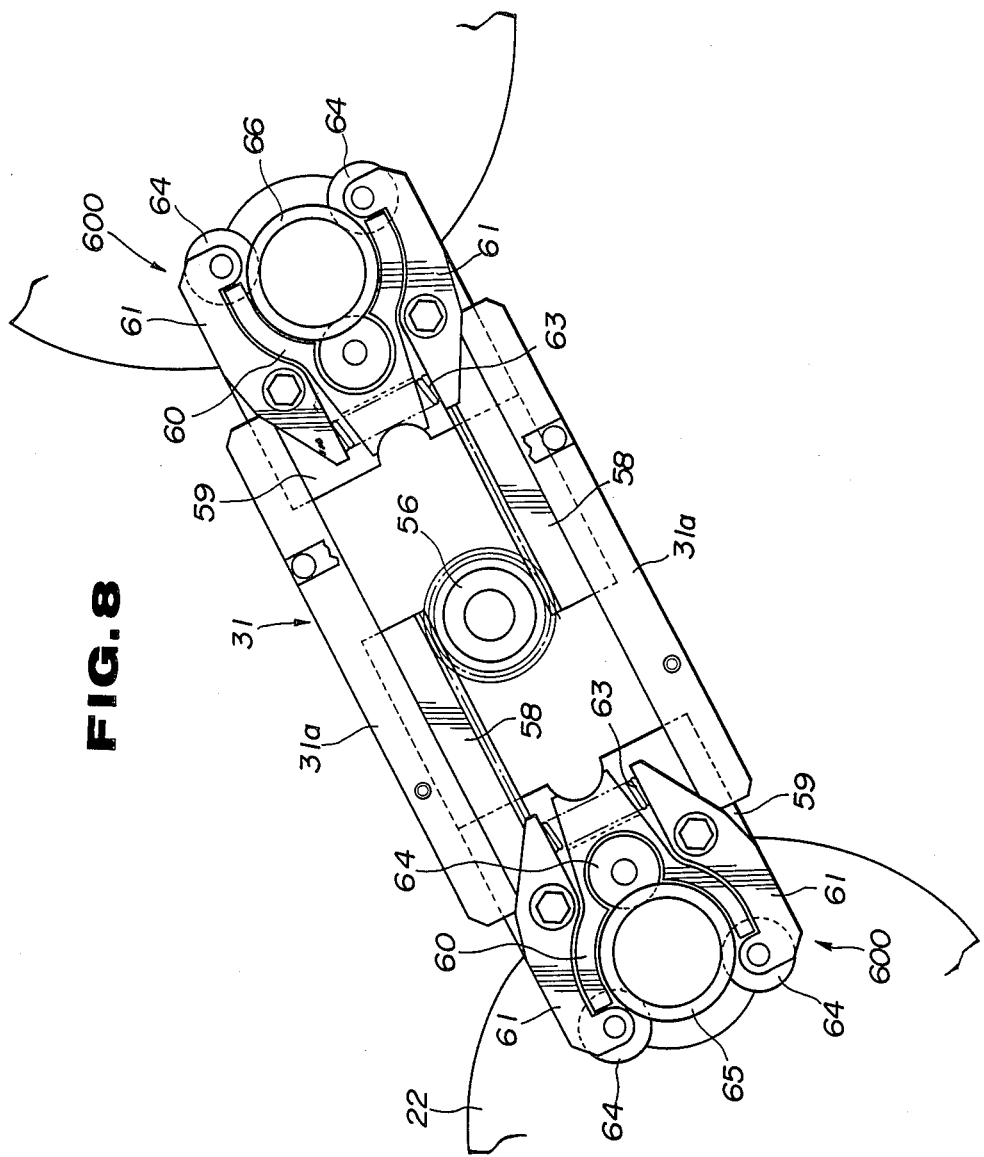

When the pinion 56 is rotated by linear movement of the inner shaft 43 to move the slide members 58 away from each other, the support plates 59 attached respectively to the slide members 58 are also moved away from each other as shown in FIG. 7. As shown in FIG. 8, the fingers 61 mounted on one of the support plates 59 now hold a tool 65 (which is shown here as a tool holder rather than a tool itself) held on the tool magazine 22. The fingers 61 mounted on the other support plate 59 hold a tool 66 mounted on the spindle device 13.

Now, a process of changing the tools 65, 66 with the tool changer 30 will be described below.

Tools are changed in a position in which the swingable arm 12 that has turned about the axis O1 positions the spindle device 13 on a line interconnecting the central axis O2 of the tool magazine 22 and the central axis O3 of the tool arm 31. This position is referred to as a reference position in which the longitudinal axis of the tool arm 31 lies parallel to the line interconnecting the axes O2, O3 (as shown in FIG. 1).

In the reference position, the motor 33 is energized to rotate the countershaft 34. The swingable link 49 engaging in the cam slot 36a of the slot cam 36 swings counterclockwise in FIG. 4 to move the inner shaft 43 to the right in FIG. 4. At this time, the pinion 56 which engages the steel ball 57 riding in the helical groove 55 of the inner shaft 43 is rotated to move the slide members 58 of the tool arm 31 away from each other. The fingers 61 are also moved with the slide members 58. As shown in FIG. 8, the tool 65 held on the tool magazine 22 is gripped by the pair of fingers 61 on one end of the tool arm 31, and the tool 66 held on the spindle device 13 is gripped by the pair of fingers 61 on the other end of the tool arm 31.

During this time, the slot cam 37 and the parallel index cam 38 rotate through the same angle as that of the slot cam 36. However, since the roller 52 of the swingable link 50 rolls in and along a straight portion of the cam slot 37a parallel to the plane in which the slot cam 37 rotates, the outer shaft 40 does not move forwardly in the axial direction. The outer shaft 40 is not rotated either since the cam portion of the parallel index cam 38 rotates in an angular range in which it does not engage the cam follower of the spider 46.

Then, the roller 52 of the swingable link 50 enters a portion of the cam slot 37a which does not lie parallel to the plane in which the slot cam 37 rotates, whereupon the swingable link 50 swings clockwise in FIG. 4, causing the outer shaft 40 and the tool arm 31 to project to the left. This motion of the tool arm 31 pulls the tools 65, 66 out of the tool magazine 22 and the spindle device 13, respectively. At, this time, the pinion 56 also moves along the inner shaft 43 but is not rotated as it engages the steel ball 57 which has already been positioned in the straight groove 55b. Therefore, the fingers 61 remain in the projected position as shown in FIG. 8.

After the tools 65, 66 have been pulled from the tool magazine 22 and the spindle device 13, the cam portion of the parallel index cam 38 engages the cam follower of the spider 46 thereby to turn the outer shaft 40 and the tool arm 31 fastened thereto through 180° in a vertical plane for positioning the tool 65 taken from the tool magazine 22 in front of the spindle device 13 and also positioning the tool 66 taken from the spindle device 13 in front of the tool magazine 22. Further rotation of the countershaft 34 retracts the outer shaft 40 and the tool arm 31 to install the tool 65 on the spindle device 13 and the tool 66 on the tool magazine 22. Thereafter, the cam slot 36a of the slot cam 36 causes the slide members 58 and the fingers 61 to return to their original position shown in FIG. 5, thereby releasing the tools 65, 66.

A tool changer according to a second embodiment of the present invention will be described below with reference to FIGS. 9 through 25.

Figure 9:
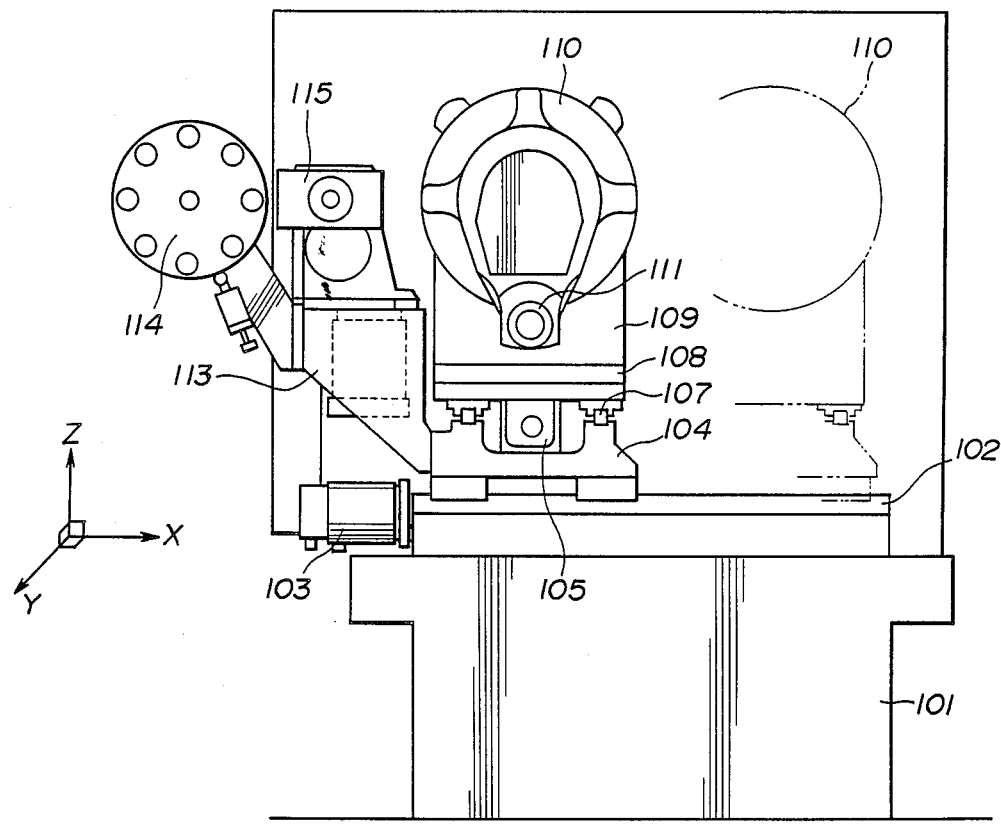
FIG. 9 is a front elevational view of a machine tool incorporating a tool changer according to a second embodiment of the present invention.
Figure 11:
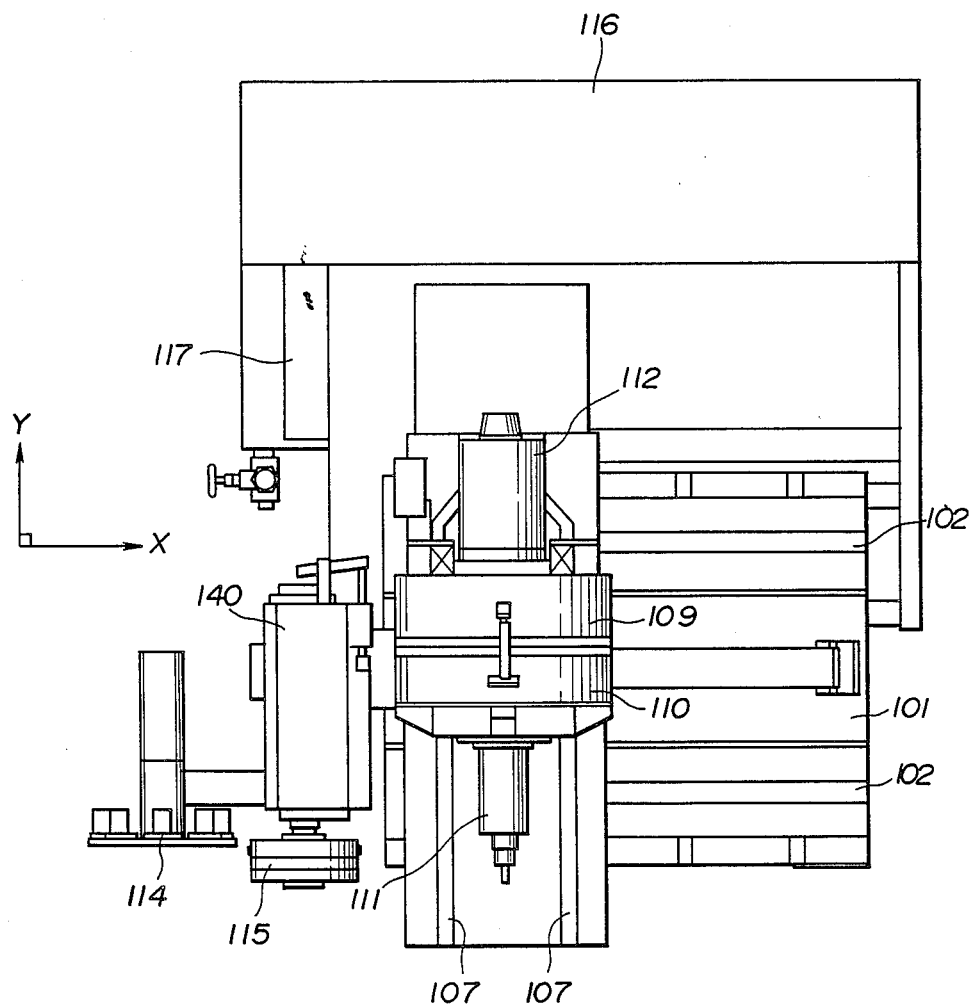
FIG. 11 is a plan view of the machine tool shown in FIG. 9.

As illustrated in FIGS. 9 through 11, guide rails 102 extending in the direction of an X-axis are mounted on a bed 101 fixedly disposed on a floor, and an X table 104 is slidably mounted on the guide rails 102, the X table 104 being movable in the direction of the axis X by a motor 103. Guide rails 107 are mounted on the X table 104, and a Y table 108 is slidably mounted on the guide rails 107. The Y table 7 can be moved in the direction of a Y axis normal to the X axis by a motor 105. A support body 109 is mounted on the Y table 108.

A turntable 110 which is rotatable in an X-Z plane by a motor disposed in the support body 109 is mounted on a front surface of the support body 109. A spindle device 111 is mounted on a front surface of the turntable 110 off the center thereof, the spindle device 111 being rotatable by a motor 112 mounted on the back of the support body 109.

An arm 113 extends obliquely upwardly from the X table 104, and a tool magazine 114 holding tools to be changed is mounted on the distal end of the arm 113. A tool changer 115 for exchanging tools between the tool magazine 114 and the spindle device 115 is mounted on an intermediate portion of the arm 113. A control box 116 with a control panel is disposed behind the bed 101, and a coolant unit 117 is installed on the floor behind the bed 101.

Figure 12:
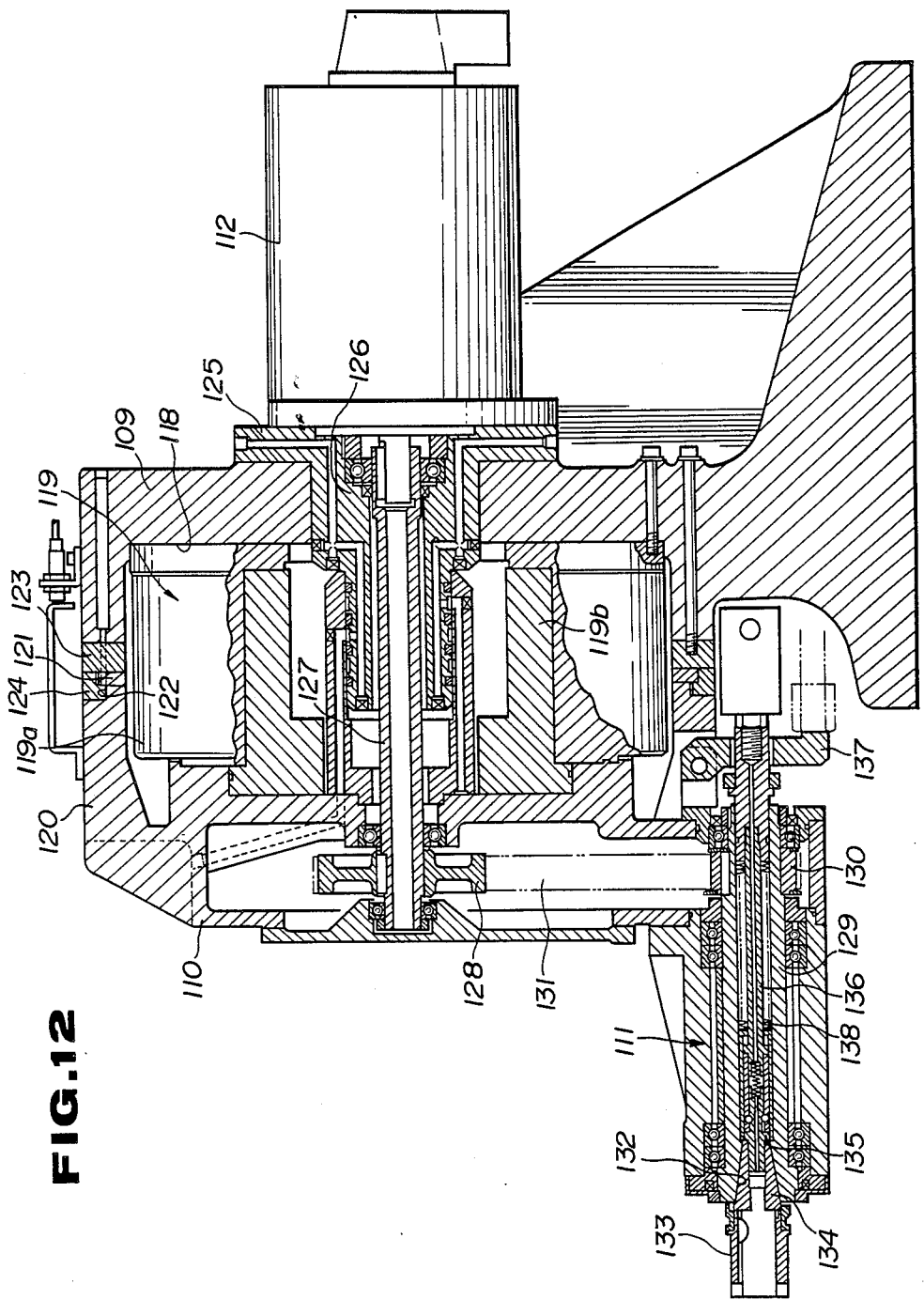
FIG. 12 is a cross-sectional view of a support body.

As shown in FIG. 12, the support body 109 has a recess 118 defined therein and opening forwardly (to the left), and houses in the recess 118 a direct-drive motor 119 for rotating the turntable 110 in a vertical plane. The motor 119 comprises a tubular fixed member 119a and a hollow rotatable shaft 119b rotatably supported in the fixed member 119a. The turntable 110 is fixed to the distal end of the hollow rotatable shaft 119b.

The turntable 110 is in the shape of a disc when viewed in front elevation. The turntable 110 is of a hollow structure having an annular rib 120 projecting rearwardly. A slidable ring 121 is mounted on the rear end of the annular rib 120 with a groove 122 being defined between the slidable ring 121 and the annular rib 120. A support ring 123 is fixed to the front surface of the support body 19 in slidable contact with the slidable ring 121. An engaging ring 124 of an L-shaped cross section is attached to the front surface of the support ring 123. With the engaging ring 124 engaging in the groove 122, a gap is defined between the engaging ring 124 and the support ring 123 to allow the slidable ring 121 to slide therein and to be sandwiched between the engaging ring 124 and the support ring 123.

The spindle motor 112 for actuating the spindle device 111 is installed on the rear surface of the support body 109 by means of a support plate 125 which includes a tubular portion 126 on its front surface. The spindle motor 112 has a shaft 127 rotatably supported in the tubular portion 126 and extending into the hollow space in the turntable 110. The distal end of the spindle motor shaft 127 supports a pulley 128. A timing belt 131 is trained around the pulley 128 and another pulley 130 fitted over a hollow spindle shaft 129 of the spindle device 111 for transmitting rotation of the spindle motor 112 to the spindle shaft 129. The spindle shaft 129 has a female tapered portion 132 defined in its distal end. A tool holder 133 has a male tapered portion 134 fitted in the female tapered portion 132 and in which a chucking member 135 is threaded. A drawbar 136 inserted in the spindle shaft 129 can be moved back and forth against the resiliency of Belleville springs 138 by a drawbar operating arm 137 which is operatively interlinked with the tool changer 115. In response to such back-and-forth movement of the drawbar 136, the tool holder 133 can be installed on and detached from the spindle device 111.

The structure and operation of the tool changer 115 will now be described with reference to FIGS. 13 through 25.

Figure 15:
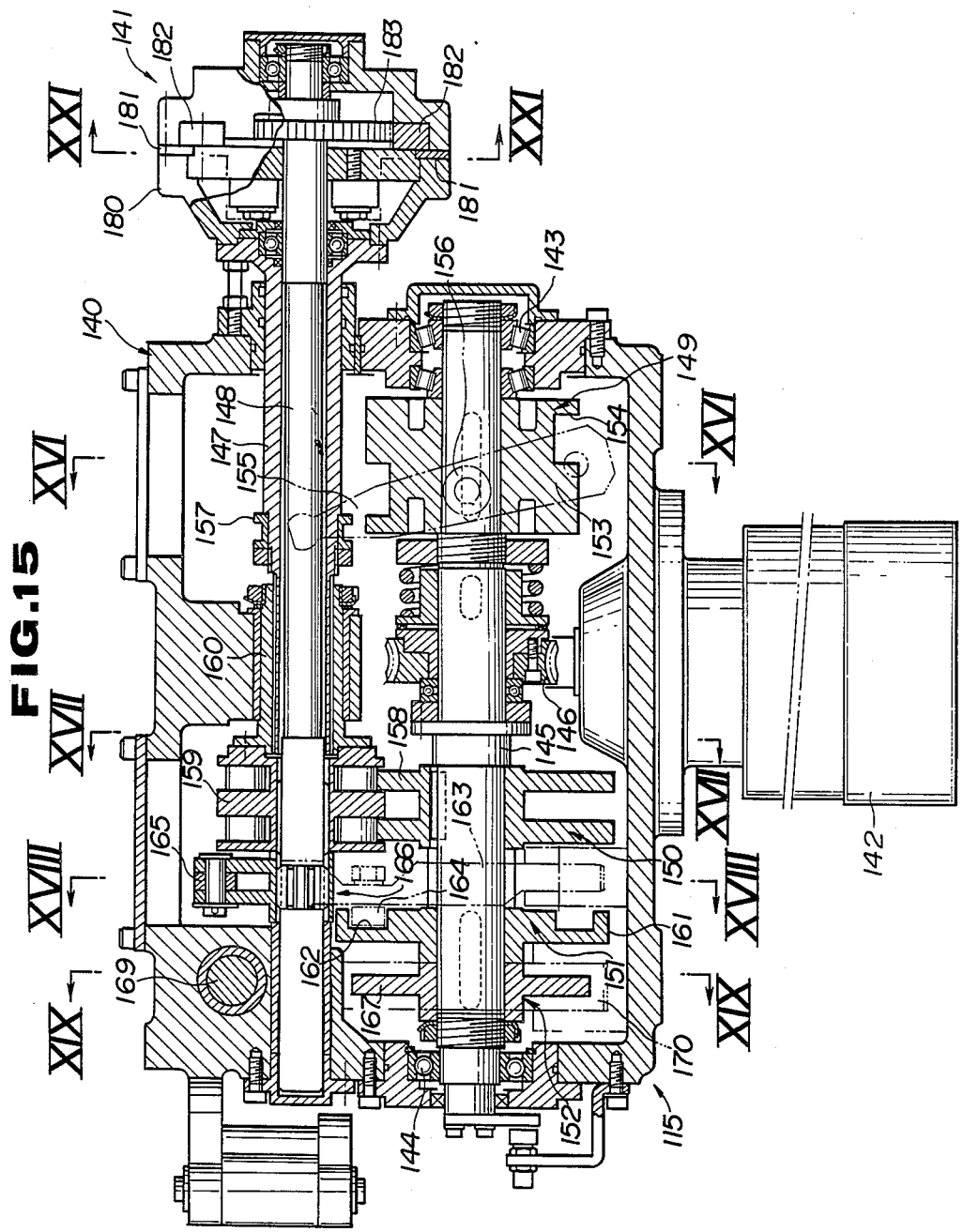
FIG. 15 is a cross-sectional view taken along line XV—XV of FIG. 13.

The tool changer 115 comprises a casing 140 housing a driver mechanism and a chucking unit 141. A motor 142 is mounted on the lower surface of the casing 140 for actuating the driver mechanism. As shown in FIG. 15, a countershaft 145 is rotatably supported in the casing 140 by means of bearings 143, 144. Rotation of the motor 142 is transmitted to the countershaft 145 by means of a worm gear 146.

An outer shaft 147 in the form of a pipe is rotatably and axially slidably supported in the casing 140 parallel to the countershaft 145. The outer shaft 147 has a distal end projecting out of the casing 140 and supporting the chucking unit 141. An inner shaft 148 is rotatably inserted in the outer shaft 147 and has opposite ends projecting out of the outer shaft 147.

Between the countershaft 145 and the outer shaft 147, there are disposed a first cam mechanism 149 and a second cam mechanism 150. A third cam mechanism 151 is disposed between the countershaft 145 and the inner shaft 148. These cam mechanisms serve to transmit rotation of the countershaft 145 as linear movement, intermittent rotation or limited rotation to the outer shaft 147 and the inner shaft 148. A fourth cam mechanism 152 is mounted on a rear end of the counterhsaft 145.

Figure 16:
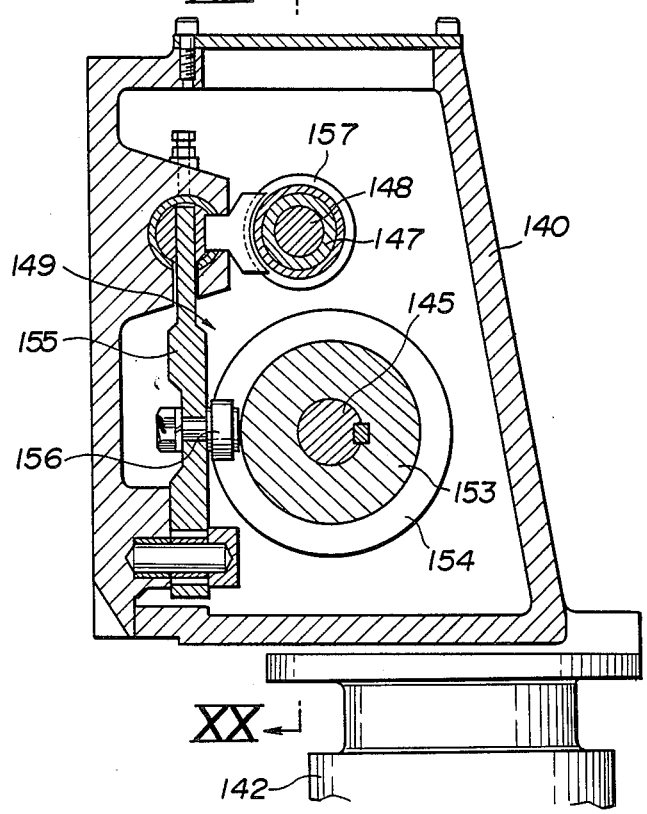
FIG. 16 is a cross-sectional view taken along line XVI—XVI of FIG. 15.

As shown in FIG. 16, the first cam mechanism 149 includes a slot cam 153 fixed to the countershaft 145 and having a cam slot 154 defined in an outer peripheral surface of the slot cam 153, and a roller 156 mounted on a swingable arm 155 having an end angularly movably supported on an inner side surface of the casing 140, the roller 156 rollingly engaging in the cam slot 154. The first cam mechanism 149 serves to transmit rotation of the countershaft 145 to the outer shaft 147 for axially moving the outer shaft 147 back and forth.

Figure 17:
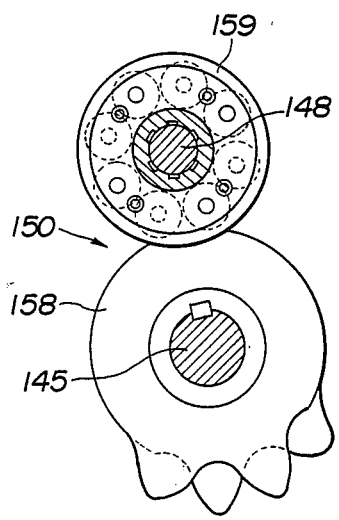
FIG. 17 is a cross-sectional view taken along line XVII—XVII of FIG. 15.

As illustrated in FIG. 17, the second cam mechanism 150 includes a parallel index cam 158 fitted over the countershaft 145 and fixed thereto by a key, and a spider 159 splined to a portion of the inner shaft 148 which projects rearwardly out of the outer shaft 147, the spider 159 engaging the parallel index cam 158. The spider 159 is fixed to an end face of a tubular member 160 which is splined to the outer shaft 147. The second cam mechanism 150 serves to transmit rotation of the countershaft 145 as intermittent rotation to the outer shaft 147.

Figure 18:
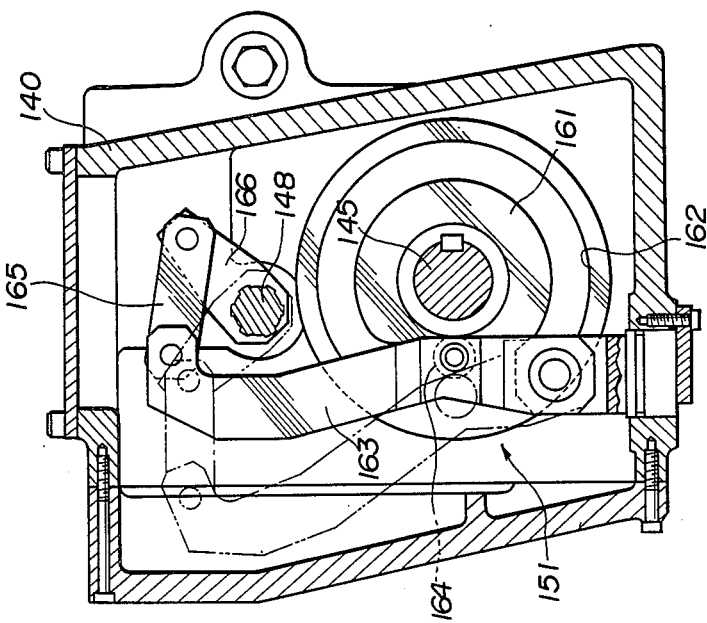
FIG. 18 is a cross-sectional view taken along line XVIII—XVIII of FIG. 15.
Figure 20:
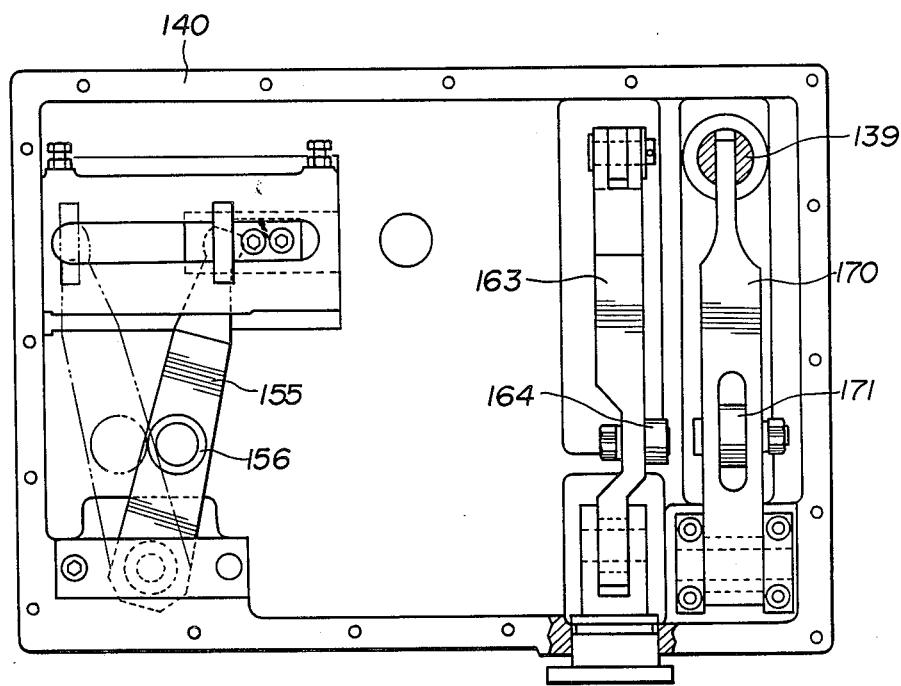
FIG. 20 is a cross-sectional view taken along line XX—XX of FIG. 16.
Figure 21:
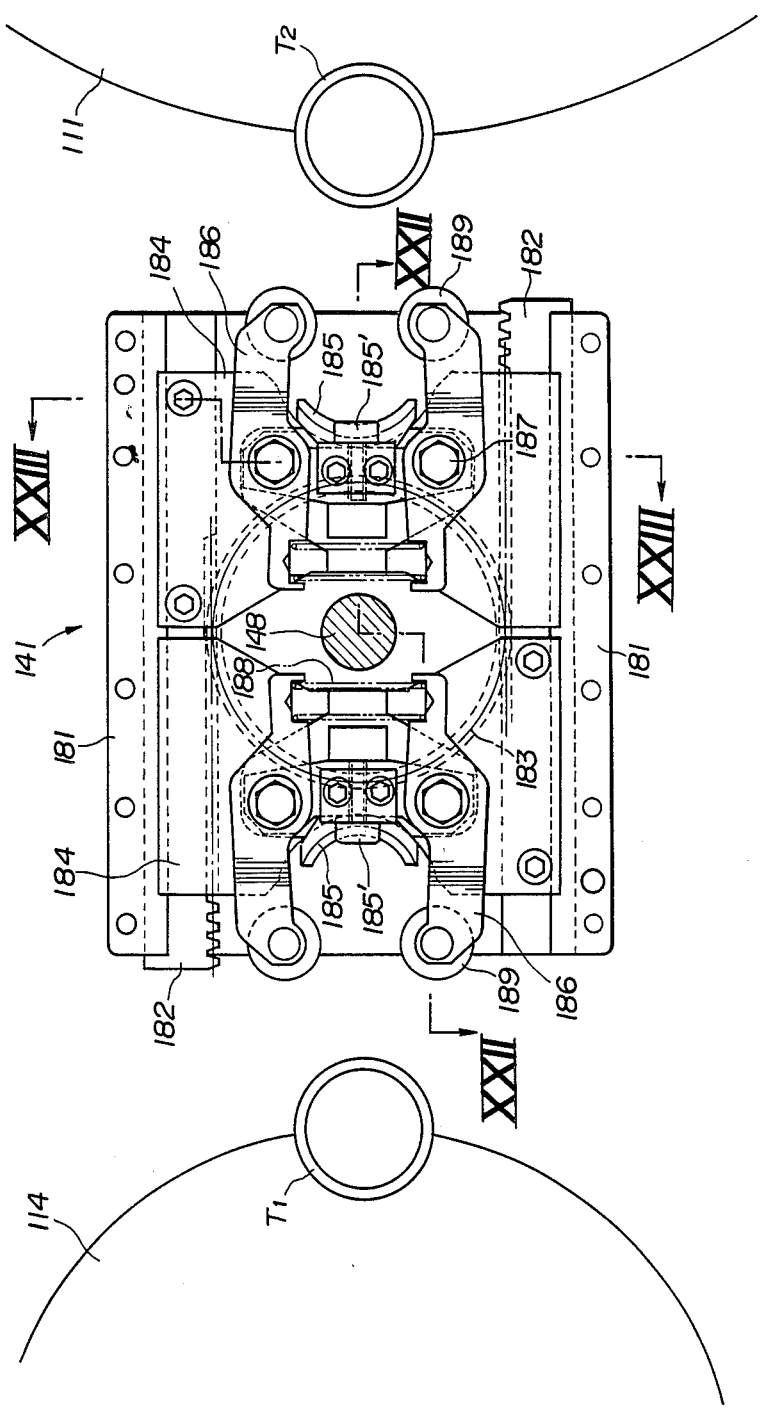
FIG. 21 is a view as seen in the direction of the arrow XXI in FIG. 15.
Figure 22:
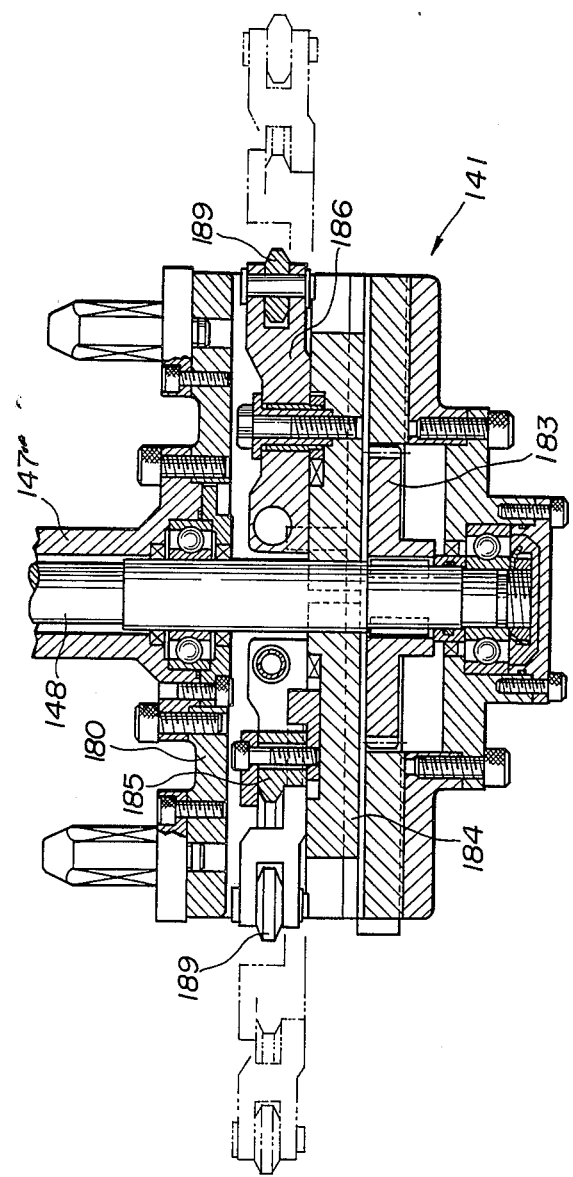
FIG. 22 is a cross-sectional view taken along line XXII—XXII of FIG. 21.

As shown in FIG. 18, the third cam mechanism 151 comprises a slot cam 161 fixed to the countershaft 145 and having a cam slot 162 defined in an end face of the slot cam 161, and a roller 164 mounted on a swingable arm 163 having an end angularly movably supported on an inner bottom of the casing 140, the roller 164 rollingly engaging in the cam slot 162. The swingable arm 163 has a distal end coupled through a link 165 to a lever 166 which is splined to the inner shaft 148. The third cam mechanism 151 therefore turns the inner shaft 148 reciprocally through a certain angle in response to rotation of the countershaft 145.

Figure 13:
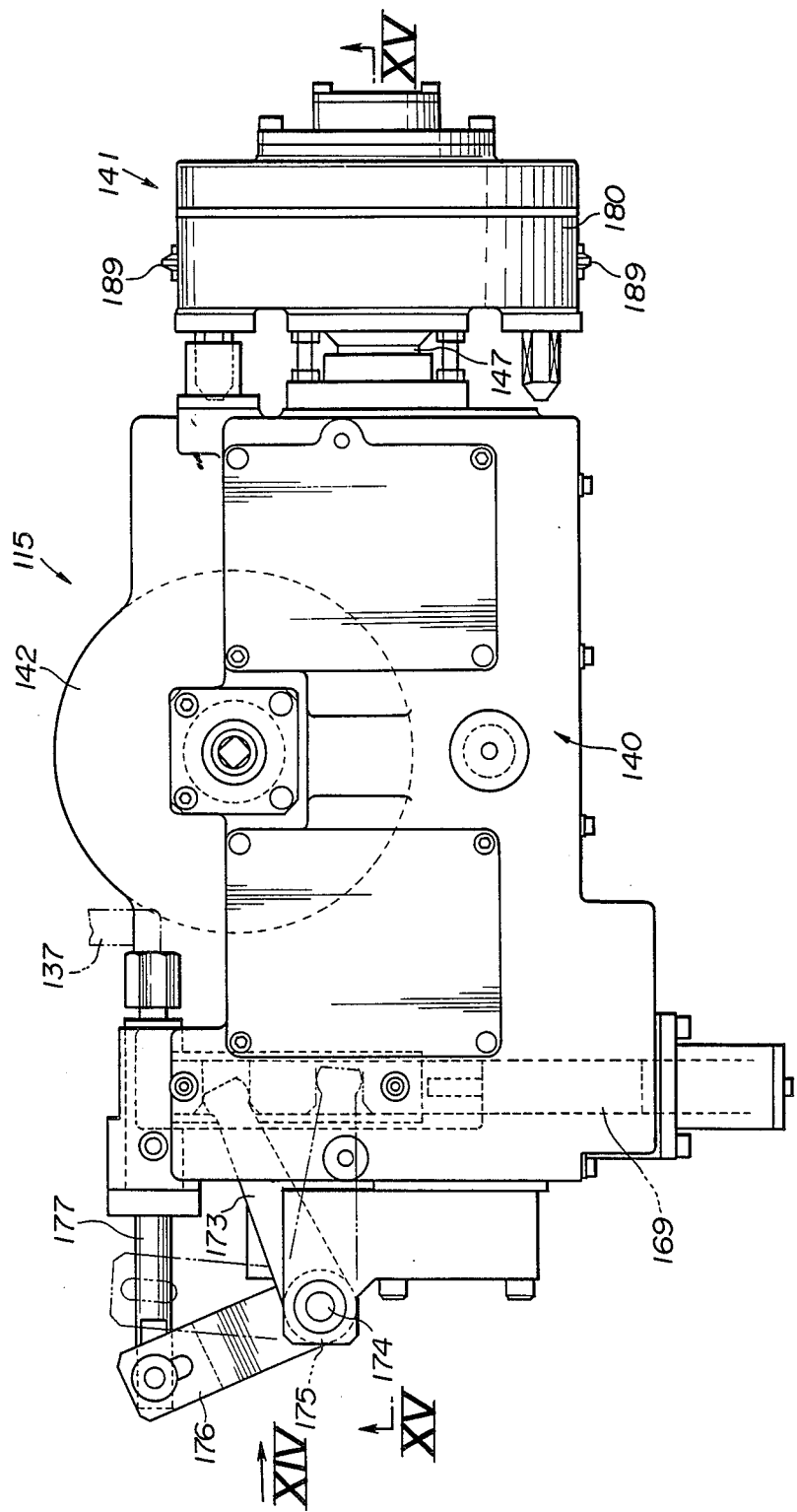
FIG. 13 is a plan view of the tool changer of the second embodiment.
Figure 14:
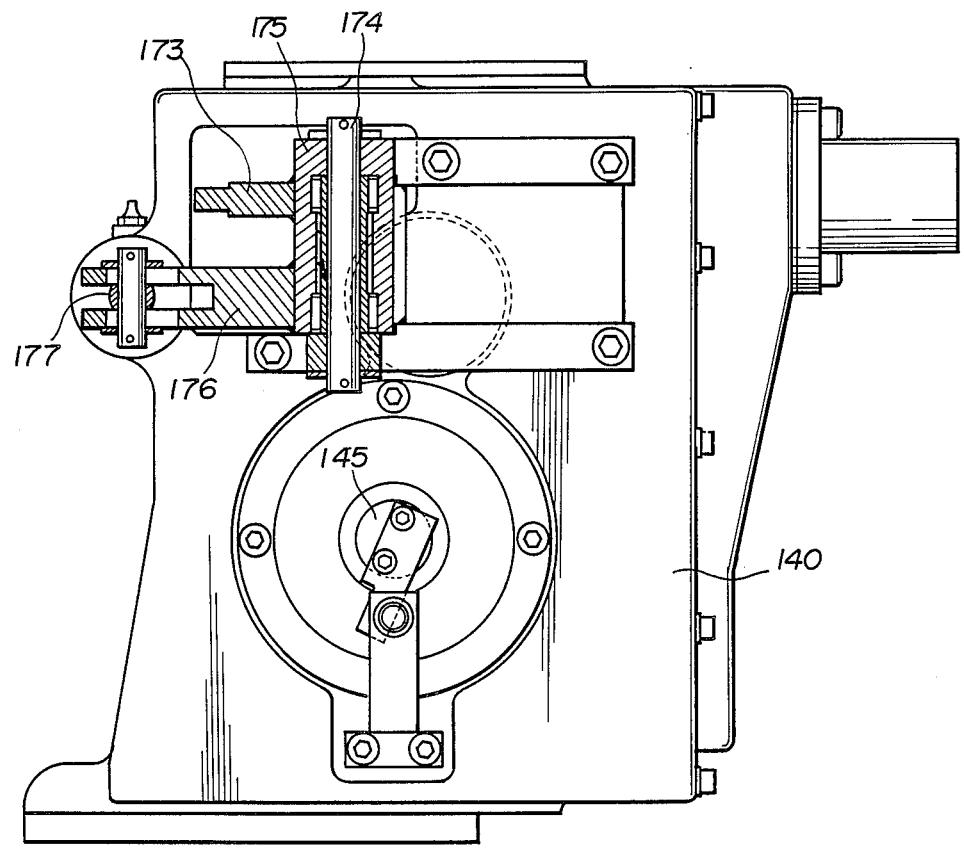
FIG. 14 is a view as seen in the direction of the arrow XIV of FIG. 13.
Figure 19:
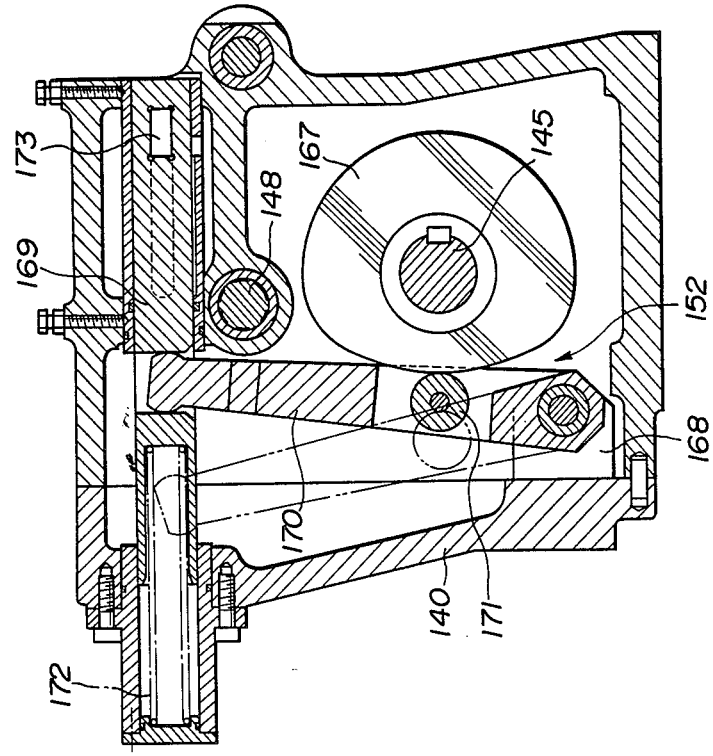
FIG. 19 is a cross-sectional view taken along line XIX—XIX of FIG. 15.

As shown in FIG. 19, the fourth cam mechanism 152 includes a plate cam 167 fixed to the countershaft 145 and a roller 171 mounted on a swingable arm 170 and held rollingly against the outer peripheral surface of the plate cam 167. The swingable arm 170 has a proximal end pivotally coupled to a bracket 168 in the casing 140 and a distal end engaging in a guide bar 169. The guide bar 169 is normally urged to move axially in one direction by means of a spring 172. As shown in FIGS. 13 and 14, one end of the guide bar 169 engages a distal end of a swingable arm 173 which has its proximal end fixed to a tubular body 175 rotatably fitted over a pin 174 mounted on a rear side of the casing 140. To the tubular body 175, there is fixed a proximal end of a lever 176 which has a distal end coupled to a pusher rod 177 slidably held by the casing 140. The pusher rod 177 has a distal end engaging the drawbar operating arm 137. Thus, tools can be exchanged between the machine tool and the tool magazine and also tools can be mounted on and dismounted from the spindle device 111, automatically by one drive source.

As illustrated in FIGS. 21 through 24, the chucking unit 141 has a box or casing 180 mounted on the distal end of the outer shaft 147. A pair of parallel rails 181 is disposed in the casing 180, and rack slide members 182 are slidably disposed between the rails 181 and inner surfaces of the casing 180. The rack slide members 182 are held in mesh with a pinion 183 fitted over the inner shaft 148. Therefore, when the pinion 183 is rotated, the rack slide members 182 are lineraly moved in mutually opposite directions. To the slide members 182, support plates 184 are respectively attached, each having a recess defined in its end. Arcuate members 185 and keys 185' are affixed to the support plates 184, and two fingers 186 are supported on the outer side of each of the arcuate members 185 for swinging movement about respective shafts 187. A spring 188 is interposed between ends of each pair of fingers 186 for normally urging the fingers 186 in a closing direction.

Rollers 189 for gripping a tool (or a tool holder) are mounted on the distal ends of the fingers 186 in each pair.

Figure 23:
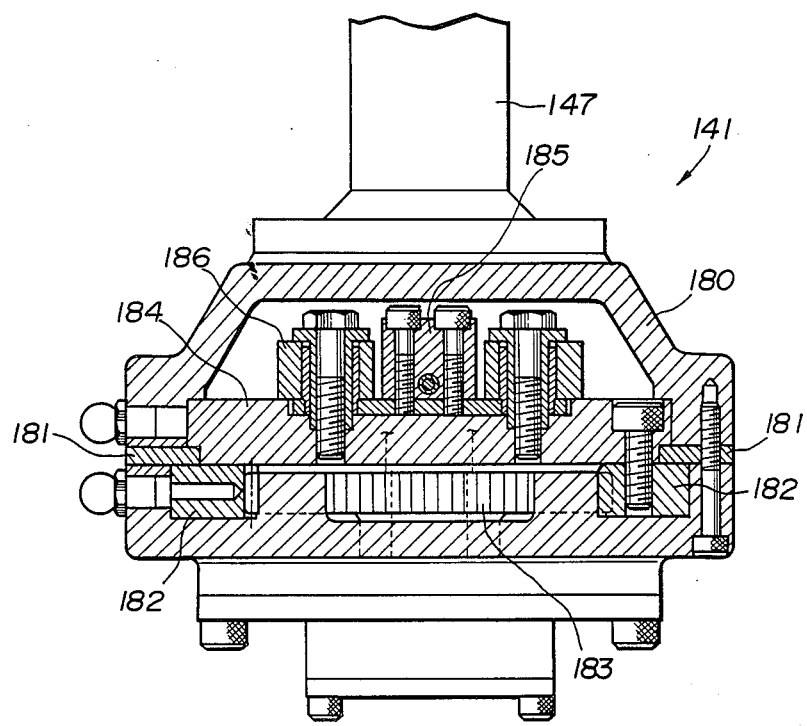
FIG. 23 is a cross-sectional view taken along line XXIII—XXIII of FIG. 21.
Figure 24:
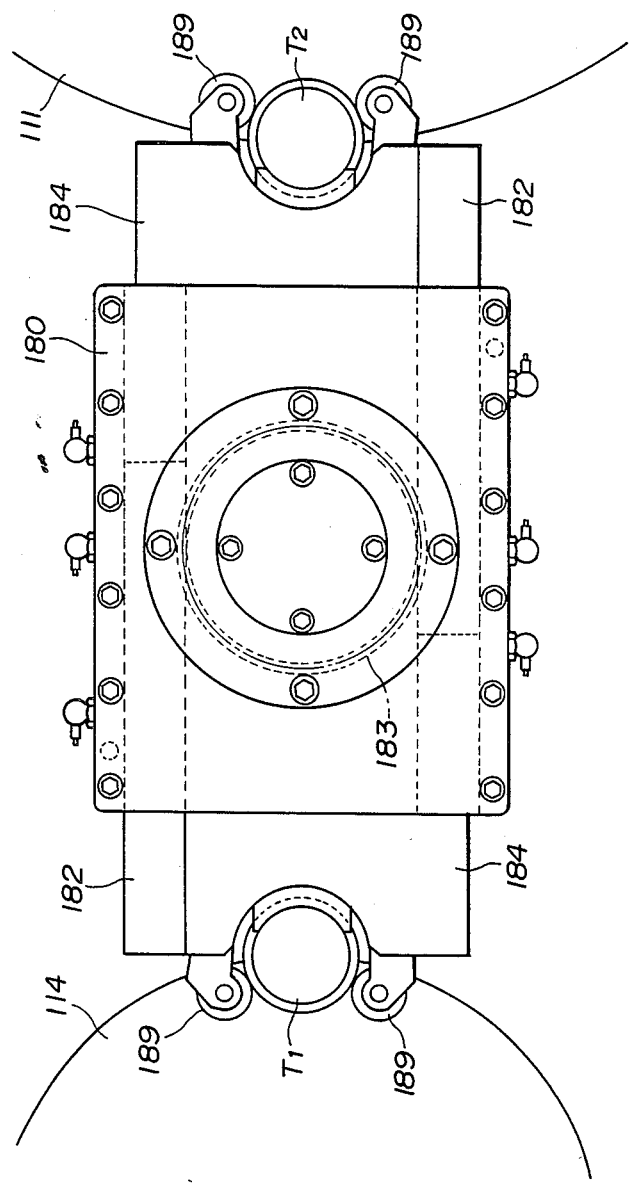
FIG. 24 is a front elevational view of a chucking unit.
Figure 25:
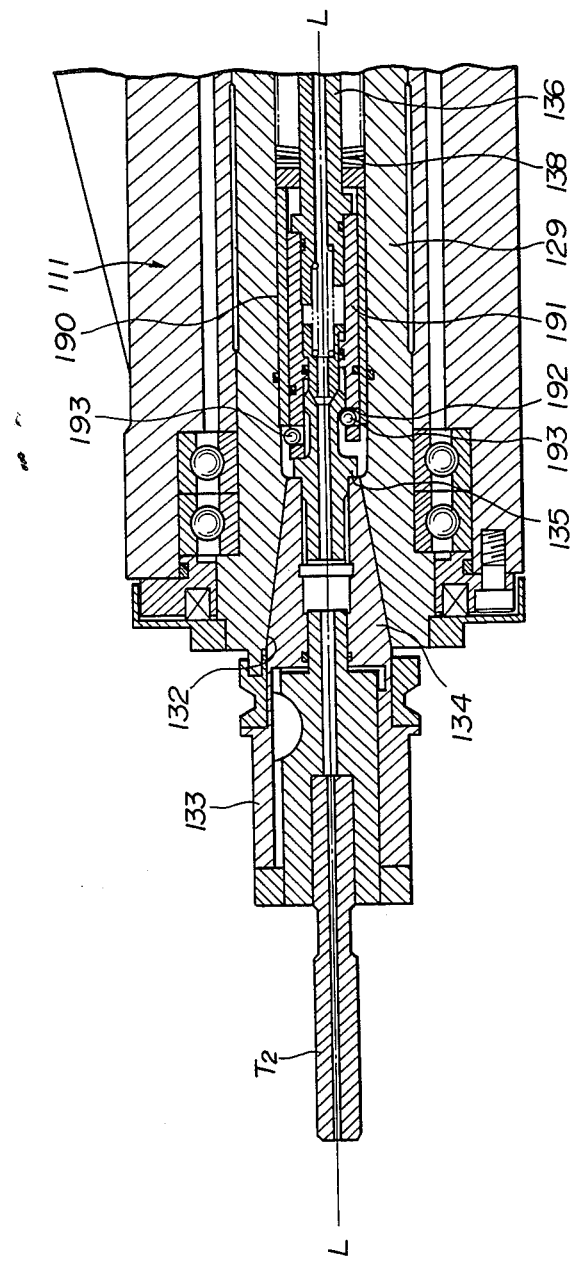
FIG. 25 is a cross-sectional view showing tool attaching and detaching operation of a spindle device.

When the inner shaft 148 is rotated to rotate the pinion 183, the slide members 182 are moved in directions away from each other. As shown in FIG. 23, the support plates 184 on the slide members 182 are also moved away from each other. As illustrated in FIG. 24, the fingers 186 on one of the support plates 184 grip a tool T1 (which is shown as a tool holder in the illustrated embodiment) held on the tool magazine 114, and the fingers 186 on the other support plate 184 grip a tool T2 mounted on the spindle device 111.

A process of changing the tools T1, T2 with the tool changer 115 will be described below.

Tools are changed in a position in which the turntable 110 that has turned positions the spindle device 111 on a line interconnecting the center of the tool magazine 114 and the center of the tool changer 115. This position is referred to as a reference position.

In the reference position, the motor 142 is energized to rotate the countershaft 145. The inner shaft 148 is rotated by the third cam mechanism 151 to rotate the pinion 183 fixed to the inner shaft 148. Upon rotation of the pinion 183, the rack slide members 182 of the chucking unit 141 move away from each other to move the fingers 186. As shown in FIG. 24, the tool T1 held by the tool magazine 114 is gripped between one pair of fingers 186, whereas the tool T2 held by the spindle device 111 is gripped between the other pair of fingers 186. Then, the fourth cam mechanism is operated to release the tool T2 from the distal end of the spindle.

Thereafter, the pusher rod 177 and the link 178 are actuated through the fourth cam mechanism 152 to move the drawbar operating arm 137 to the left in FIG. 12. As a result, as indicated in a portion of FIG. 25 above a central line L—L, an inner tube 191 slidably fitted in an outer tube 190 is pushed forwardly (to the left) by the drawbar 136 to force a steel ball 193 radially outwardly out of a through hole 192 defined in the tip end of the inner tube 191. Thus, the chucking member 135 is released from the inner tube 191. When the drawbar operating arm 137 is not operated, as indicated in a portion of FIG. 25 below the central line L—L, the inner tube 191 is moved in unison with the drawbar 136 to the right under the resiliency of the Belleville springs 138. The steel ball 193 is then pushed radially inwardly by the inner peripheral surface of the outer tube 190 for thereby restraining the chucking member 135 radially inwardly.

During this time, the slot cam 153 of the first cam mechanism 149 and the parallel index cam 158 of the second cam mechanism 150 rotate through the same angle as that of the slot cam 161 of the third cam mechanism 151. However, since the roller 156 of the swingable link 155 of the first cam mechanism 149 rolls in and along a straight portion of the cam slot 154 parallel to the plane in which the slot cam 153 rotates, the outer shaft 147 does not move forwardly in the axial direction. The outer shaft 147 is not rotated either since the cam portion of the parallel index cam 158 rotates in an angular range in which it does not engage the cam follower of the spider 159.

Then, the roller 156 of the swingable link 155 enters a portion of the cam slot 154 which does not lie parallel to the plane in which the slot cam 153 rotates, whereupon the swingable link 155 swings clockwise in FIG. 17, causing the outer shaft 147 and the chucking unit 141 to project to the right. This motion of the chucking unit 141 pulls the tools T1, T2 out of the tool magazine 114 and the spindle device 111, respectively. At this time, the inner shaft 148 and the pinion 183 are not rotated, and hence the fingers 186 remain in the projected position as shown in FIG. 24.

After the tools T1, T2 have been pulled from the tool magazine 114 and the spindle device 111, the cam portion of the parallel index cam 158 is caused by the second cam mechanism 150 to engage the cam follower of the spider 159 thereby to turn the outer shaft 147 and the chucking unit 141 fastened thereto through 180° in a vertical plane for positioning the tool T1 taken from the tool magazine 114 in front of the spindle device 111 and also positioning the tool T2 taken from the spindle device 111 in front of the tool magazine 114. Further rotation of the countershaft 145 returns the first mechanism 149 to its original position to retract the outer shaft 147 and the chucking unit 141 to install the tool T1 on the spindle device 111 and the tool T2 on the tool magazine 114. The fourth cam mechanism 152 is operated to retract the pusher rod 177 to allow the tool T2 to be gripped by the spindle. Thereafter, the inner shaft 148 is rotated by the third cam mechanism 151 to return the fingers 186 to their original position shown in FIG. 21, thereby releasing the tools T1, T2.

With the arrangement of the present invention, as described above, a pair of chucking units for gripping tools is mounted on the ends of the tool arm, and can be moved simultaneously in the plane in which the tool arm is angularly movable, in directions passing through the center of angular movement of the tool arm. While the tool arm is being rotated 180°, the new tool can be installed and the existing tool can be returned to the tool magazine in one cycle time Therefore, the efficiency of tool changing operation can greatly be improved.

Various different motions in the tool changer can be performed by a single drive source, and tools can be changed and attached and detached by the single drive source. Accordingly, the entire tool changer is made compact, lightweight, and highly reliable in operation. Since rotation of the countershaft is smoothly transmitted to the outer shaft and the inner shaft, the tool changer is less liable to failure and has a prolonged service life.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A tool changer in a machine tool having a spindle device for holding and rotating a tool about a spindle shaft and a tool magazine for storing a plurality of tools to be mounted, one at a time, on the spindle device, said spindle device being movably supported around a first axis generally parallel to said spindle shaft, and said tool magazine being rotatably supported about a second axis generally parallel to said first axis, said tool changer comprising:

a tool arm disposed between said spindle device and said tool magazine, said tool arm being angularly movable about a third axis generally parallel to said first and second axes on a plane including said first and second axes, and movable along said third axis;

a pair of chucking units mounted respectively on ends of said tool arm and movable in mutually opposite directions passing through said third axis for simultaneously gripping tools, respectively; and a mechanism for actuating said tool arm and said chucking units.

2. The tool changer according to claim 1, wherein said machine tool includes a bed having a reference surface of an X-Y plane, a cross-slide table mounted on said bed and having an X table slidable along X axis and a Y table slidable along Y axis which is generally perpendicular to said X axis, and a turning member mounted on said cross-slide table and angularly movable in plane generally perpendicular to the reference surface of said bed, said spindle device being mounted on said turning member at a certain distance from a center of angular movement of said turning member.

3. The tool changer according to claim 1, wherein said chucking units include slide members having respective racks, said mechanism comprising a single drive motor, a countershaft rotatable by said driver motor, an outer shaft extending generally parallel to said countershaft and supporting said tool arm on a distal end thereof, an inner shaft axially movably inserted in said outer shaft and having a groove defined in an outer periphery of a distal end portion thereof, a pinion meshing with said racks of the slide members and fitted over the grooved distal end portion of said inner shaft, a ball disposed between said groove of the inner shaft and said pinion, a first cam mechanism disposed between said countershaft and said outer shaft for axially moving said outer shaft, a second cam mechanism disposed between said countershaft and said outer shaft for intermittently rotating said outer shaft, and a third cam mechanism disposed between said countershaft and said inner shaft for axially moving said inner shaft.

4. The tool changer according to claim 1, wherein said chucking units include slide members having respective racks, said mechanism comprising a single drive motor, a countershaft rotatable by said driver motor, an outer shaft generally parallel to said countershaft and supporting said tool arm on a distal end thereof, an inner shaft angularly movably inserted in said outer shaft, a pinion meshing with said racks of the slide members and fixed to said inner shaft, a first cam mechanism disposed between said countershaft and said outer shaft for axially moving said outer shaft, a second cam mechanism disposed between said countershaft and said outer shaft for intermittently rotating said outer shaft, and a third cam mechanism disposed between said countershaft and said inner shaft for rotating said inner shaft.

5. The tool changer according to claim 4, wherein said spindle device has a drawbar for mounting a tool thereon and dismounting a tool therefrom, said mechanism further comprising a fourth cam mechanism for operating said drawbar in response to rotation of said countershaft, whereby a tool can be mounted on and dismounted from said spindle device in coaction with changing tools between said spindle device and said tool magazine.

* * * * *